US010239527B2

(12) United States Patent
Hada

(10) Patent No.: US 10,239,527 B2
(45) Date of Patent: Mar. 26, 2019

(54) DRIVING RATINGS FOR LEADING OR FOLLOWING VEHICLE SELECTION

(71) Applicant: Toyota Motor Engineering & Manufacturing North America, Inc., Erlanger, KY (US)

(72) Inventor: Hideki Hada, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 438 days.

(21) Appl. No.: 15/052,647

(22) Filed: Feb. 24, 2016

(65) Prior Publication Data

US 2017/0243504 A1 Aug. 24, 2017

(51) Int. Cl.
*G06N 5/04* (2006.01)
*G09B 5/12* (2006.01)
*G09B 9/042* (2006.01)
*B60W 30/16* (2012.01)
*B60W 40/04* (2006.01)
(Continued)

(52) U.S. Cl.
CPC .......... *B60W 30/16* (2013.01); *B60W 30/165* (2013.01); *B60W 40/04* (2013.01); *G06N 5/04* (2013.01); *B60W 2050/146* (2013.01); *B60W 2540/04* (2013.01)

(58) Field of Classification Search
CPC .... B60W 30/16; B60W 40/04; B60W 30/165; B60W 2050/146; B60W 2540/04; G06N 5/04
See application file for complete search history.

(56) References Cited

U.S. PATENT DOCUMENTS 8,005,759 B2 8/2011 Hirtenstein et al.
9,058,703 B2 6/2015 Ricci
9,081,650 B1 7/2015 Brinkmann et al.
(Continued)

FOREIGN PATENT DOCUMENTS

WO 2006028484 A1 3/2006

OTHER PUBLICATIONS

Zeng, Xiaosi, Kevin N. Balke, and Praprut Songchitruksa. Potential connected vehicle applications to enhance mobility, safety, and environmental security. No. SWUTC/12/161103-1. Southwest Region University Transportation Center, Texas Transportation Institute, Texas A & M University System, 2012. (Year: 2012).*

*Primary Examiner* — Alan D Hutchinson
(74) *Attorney, Agent, or Firm* — Christopher G. Darrow; Darrow Mustafa PC

(57) ABSTRACT

Driving rating information for other vehicles in an external environment of a vehicle can be provided. The external environment of the vehicle can be sensed to detect the other vehicles. Driving rating information for the other vehicles can be received, such as directly from the other vehicles or from a remote driving ratings source. The driving rating information for the other vehicles can be presented within the vehicle. Based on such driving rating information, a vehicle occupant can decide whether or not to lead or follow a particular vehicle in the external environment. If a selection of one of the identified one or more vehicles is received from a vehicle occupant, the vehicle can be caused to implement one or more driving maneuvers relative to the selected vehicle.

20 Claims, 10 Drawing Sheets

(51) Int. Cl.
*B60W 30/165* (2012.01)
*B60W 50/14* (2012.01)

(56) References Cited

U.S. PATENT DOCUMENTS

| | | | |
|---|---|---|---|
| 9,104,535 | B1 | 8/2015 | Brinkmann et al. |
| 9,114,810 | B2 | 8/2015 | Sudou et al. |
| 9,141,582 | B1 | 9/2015 | Brinkmann et al. |
| 9,922,554 | B2* | 3/2018 | Mikuni ................ G08G 1/0962 |
| 2014/0306834 | A1 | 10/2014 | Ricci |
| 2014/0309849 | A1 | 10/2014 | Ricci |
| 2015/0039350 | A1* | 2/2015 | Martin ................ G06Q 30/0261 |
| | | | 705/4 |
| 2016/0001776 | A1* | 1/2016 | Kim ..................... B60W 10/06 |
| | | | 701/96 |
| 2017/0021833 | A1* | 1/2017 | Abdel-Rahman ... B60W 30/165 |
| 2017/0210394 | A1* | 7/2017 | Yamada ................ B60W 50/10 |

* cited by examiner

DRIVING RATINGS FOR LEADING OR FOLLOWING VEHICLE SELECTION

FIELD

The subject matter described herein relates in general to vehicles and, more particularly, to the operation of such vehicles relative to other vehicles in the surrounding environment.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the subject matter described herein is directed to a method of providing driving rating information. The method includes sensing an external environment of the vehicle to detect one or more vehicles located therein. The method includes receiving driving rating information for the one or more vehicles. The method further includes causing the driving rating information for the one or more vehicles to be presented within the vehicle.

In another respect, the subject matter described herein is directed to a driving rating information system. The system includes a sensor system operatively connected to a processor. The sensor system can be configured to sense an external environment of the vehicle to detect one or more vehicles located therein. The processor can be programmed to initiate executable operations. The executable operations can include receiving driving rating information for the one or more vehicles. The executable operations can include presenting the driving rating information for the one or more vehicles to be presented within the vehicle or causing the driving rating information for the one or more vehicles to be presented within the vehicle.

DETAILED DESCRIPTION

Figure 1:
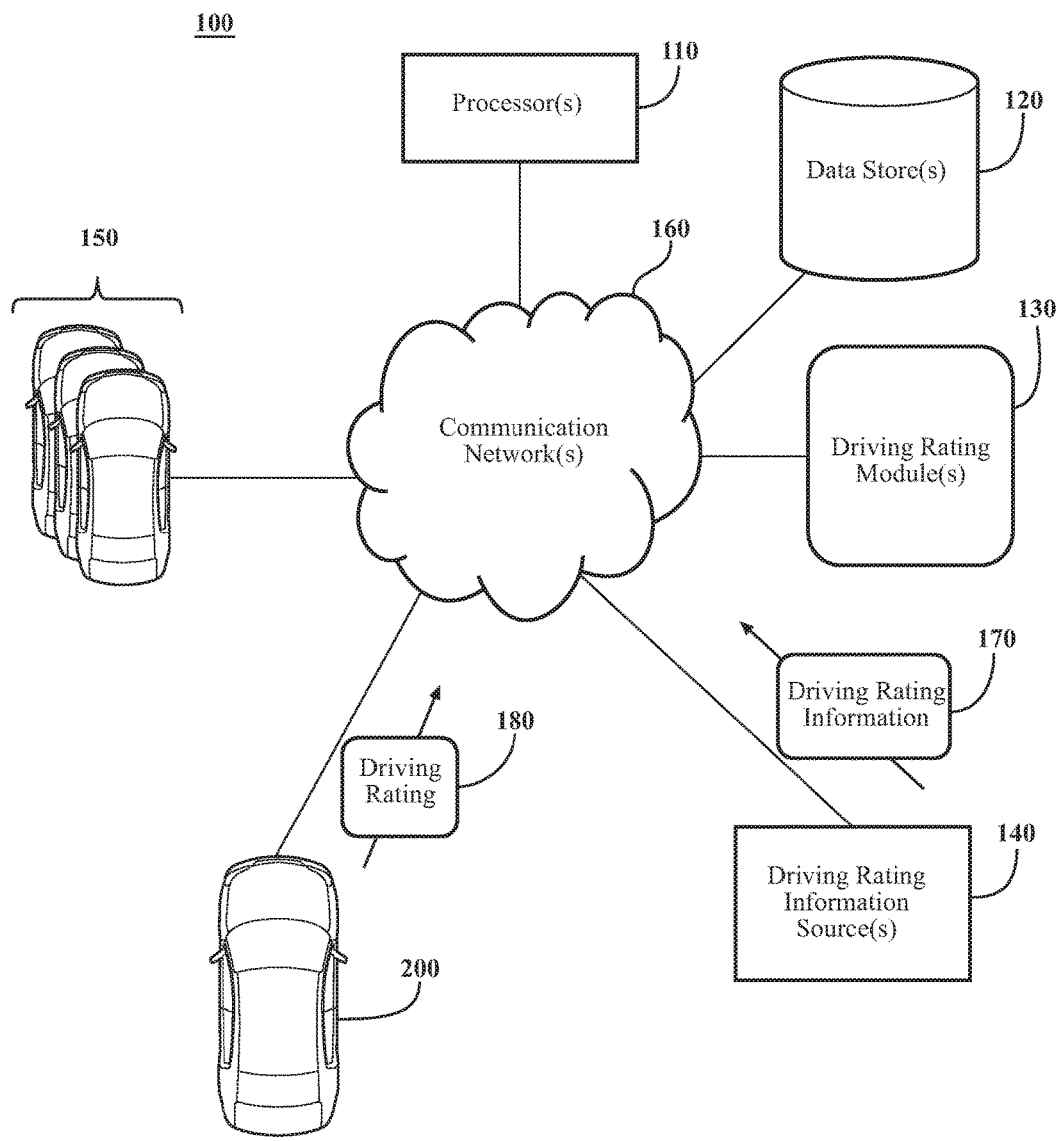
FIG. 1 is an example of a driving rating information system.

This detailed description relates to the operation of a vehicle relative to other vehicles. For instance, a vehicle can present and/or generate driving ratings for other vehicles detected in an external environment. The external environment of the vehicle can be sensed to detect one or more vehicles located therein. The method includes receiving driving rating information for the one or more vehicles. The method further includes presenting the driving rating information for the one or more vehicles within the vehicle or causing the driving rating information for the one or more vehicles to be presented within the vehicle. When the driving rating information is presented within the vehicle, a vehicle occupant (e.g., the vehicle driver) can make informed decisions as to which vehicle in the external environment should be selected to follow or to lead. The present detailed description relates to systems, methods and computer program products that incorporate one or more of such features. In at least some instances, such systems, methods and computer program products can improve the performance and/or the safe operation of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a driving rating information system 100. Some of the possible elements of the system 100 are shown in FIG. 1 and will now be described. It will be understood that it is not necessary for the system 100 to have all of the elements shown in FIG. 1 or described herein. The system 100 can include a one or more processors 110, one or more data stores 120, one or more driving rating modules 130, one or more driving rating information sources 140, one or more nearby vehicles 150, and/or a vehicle 200.

The various elements of the system 100 can be communicatively linked through one or more communication networks 160. As used herein, the term "communicatively linked" can include direct or indirect connections through a communication channel or pathway or another component or system. A "communication network" means one or more components designed to transmit and/or receive information from one source to another. The communication network(s) 160 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 160 further can be implemented as or include one or more wireless networks, whether short or long range. For example, in terms of short range wireless networks, the communication network(s) 160 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 160 can include a mobile, cellular, and or satellite-based wireless network and support voice, video, text, and/or any combination thereof. Examples of long range wireless networks can include GSM, TDMA, CDMA, WCDMA networks or the like. The communication network(s) 160 can include wired communication links and/or wireless communication links. The communication network(s) 160 can include any combination of the above networks and/or other types of networks. The communication network(s) 160 can include one or more routers, switches, access points, wireless access points, and/or the like. In one or more arrangements, the communication network(s) 160 can include Vehicle-to-Vehicle or Vehicle-to-Everything (V2X) technology, which can allow for communications between the nearby vehicle(s) 150 and the vehicle 200.

One or more elements of the system include and/or can execute suitable communication software, which enables two or more of the elements to communicate with each other through the communication network(s) 160 and perform the functions disclosed herein. For instance, the vehicle 200 can be configured to receive driving rating information 170 from one or more driving rating information source(s) 140, which can be one or more of the nearby vehicle(s) 150, a remote server, or a data store 120. As another example, the vehicle 200 can be configured to determine a driving rating 180 for one or more of the nearby vehicles 150. A "nearby vehicle" includes any vehicle within the sensor range of the vehicle 200. In one respect, the nearby vehicles 150 can be those vehicles that are located within the sensor range of the vehicle 200 and in which there is no other vehicle located between it and the vehicle 200. However, in some instances, the nearby vehicles 150 can also include vehicles that are separated from the vehicle 200 by one or more other vehicles. Alternatively or in addition, one or more of the nearby vehicle(s) 150 can be configured to determine a driving rating for the vehicle 200.

The driving rating 180 can include an identifier for the respective nearby vehicle 150 that is being rated. The driving rating 180 can be sent to the driving rating information source(s) 140. The driving rating 180 can be associated with existing driving ratings for the same identifier (or otherwise for the same vehicle) or a new entry can be created if the identifier (or vehicle) is not already included in the driving rating information source(s) 140. The nearby vehicle(s) 150 and/or the vehicle 200 can be configured to store their respective driving rating information onboard or in a remote location (e.g., a central remote server or data store).

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

In one or more arrangements, one or more processors 110 can be located onboard the vehicle 200. In one or more arrangements, one or more processors 110 can be located remote from the vehicle 200. For instance, one or more processors 110 can be a remote server or part of a remote server. In one or more arrangements, one or more of the processors 110 can be located onboard the vehicle 200, and one or more of the processors 110 can be located remote from the vehicle 200. In one or more arrangements, one or more of the processors 110 can be located onboard one or more of the nearby vehicles 150. In one or more arrangements, one or more of the processors 110 can be part of one or more driving rating information sources 140.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In one or more arrangements, one or more data stores 120 can be located onboard the vehicle 200. In one or more arrangements, one or more data stores 120 can be located remote from the vehicle 200. In one or more arrangements, one or more data stores 120 can be located onboard the vehicle 200, and one or more data stores 120 can be located remote from the vehicle 200. In one or more arrangements, one or more of the data stores 120 can be located onboard one or more of the nearby vehicles 150. In one or more arrangements, one or more of the data stores 120 can be part of one or more driving rating information sources 140.

The driving rating module(s) 130 and/or the data store(s) 120 can be components of the processor(s) 110. In one or more arrangements, the driving rating module(s) 130 and/or the data store(s) 120 can be stored on, accessed by and/or executed on the processor(s) 110. In one or more arrangements, the driving rating module(s) 130 and/or the data store(s) 120 can be executed on and/or distributed among other processing systems to which the processor(s) 110 is communicatively linked. For instance, at least a portion of the driving rating module(s) 130 can be located onboard the vehicle 200. In one or more arrangements, a first portion of the driving rating module(s) 130 can be located onboard the vehicle 200, and a second portion of the driving rating module(s) 130 can be located remote from the vehicle 200 (e.g., on a cloud-based server, a remote computing system, and/or the processor(s) 110). In one or more arrangements, the driving rating module(s) 130 can be located remote from the vehicle 200. In some instances, one or more of the nearby vehicles 150 can have a driving rating module(s) 130 located onboard and/or remote from the nearby vehicle 150.

The driving rating module(s) 130 can be implemented as computer readable program code that, when executed by a processor, implement one or more of the various processes described herein. The driving rating module(s) 130 can be a component of one or more of the processor(s) 110 or other processor(s) (e.g., one or more processors(s) of the vehicle 200 (see FIG. 2), or the driving rating module(s) 130 can be executed on and/or distributed among other processing systems to which one or more of the processor(s) 110 is operatively connected. In one or more arrangements, the driving rating module(s) 130 can include artificial or computational intelligence elements, e.g., neural network, fuzzy logic or other machine learning algorithms.

The driving rating module(s) 130 can include instructions (e.g., program logic) executable by a processor. Alternatively or in addition, one or more of the data stores 120 may contain such instructions. Such instructions can include instructions to execute various functions and/or to transmit data to, receive data from, interact with, and/or control one or more elements of the system 100. Such instructions can enable the various elements of the system 100 to communicate through the communication network 160.

The driving rating module(s) 130 can be located onboard the vehicle 200, onboard one or more of the nearby vehicles 150, remote from the vehicle 200, and/or remote from the nearby vehicle(s) 150. The driving rating module(s) 130 can be configured to receive driving rating information 170, present driving rating information 170 within the vehicle 200, cause driving rating information 170 to be presented within the vehicle 200, and/or determine a driving rating 180 for one or more of the nearby vehicles 150. The driving rating module(s) 130 can receive driving rating information 170 from one or more driving rating information sources 140, such as one or more of the nearby vehicles 150 and/or remote source(s) (e.g., remote server(s), remote data store(s), etc.).

The received driving rating information 170 can be analyzed and/or processed by the driving rating module(s) 130 and/or the processor(s) 110. For instance, the driving rating module(s) 130 and/or the processor(s) 110 can filter or ignore driving rating information based on one or more predefined criteria, as set by a user or some other entity. As an example, the driving rating module(s) 130 can be configured to filter or ignore driving rating information 170 received from the nearby vehicle(s) 150/driver(s) that provide an excessive number of ratings, from the nearby vehicle(s) 150/driver(s) that have a poor driving rating, from the nearby vehicle(s) 150/driver(s) that provide negative driving ratings (or highly negative driving ratings) a majority of the time, and/or from the nearby vehicle(s) 150/driver(s) that provide positive driving ratings (or highly positive driving ratings) a majority of the time just to name a few possibilities. The driving rating module(s) 130 can average the individual driving ratings included in the driving rating information 170 to provide an average driving rating. The driving rating module(s) 130 can perform any suitable statistical or mathematical analysis and/or operation to the driving rating information. While a single vehicle may have only one driver or a plurality of drivers, the driving rating module(s) 130 can associate all rating with a specific vehicle.

The driving rating module(s) 130 can be configured to determine or assign a driving rating score based on the received driving rating information 170 for a particular vehicle. The driving rating score can be determined or assigned based on predefined criteria. For driving rating score can be in any suitable form. For instance, the driving rating score can be a letter grade similar to school grades, a numeric grade (e.g., on a 1 to 3 scale, 1 to 5 scale, 1 to 10 scale, 1 to 100 scale, etc.), word-based (e.g., poor, average, good excellent, etc.), symbol-based (e.g., stars, smiling faces, thumbs up, etc.), just to name a few possibilities. The driving rating score can be a single score, or it can be a plurality of scores for various parameters.

The driving rating score can be in any form so that its information is readily viewed and understood by a vehicle occupant. The driving rating score can be determined at any suitable point in time. For instance, the driving rating score can be determined after the received driving rating information 170 has been analyzed or processed as described above.

As will be explained in greater detail herein, the driving rating module(s) 130 can be configured to present or cause to be presented the driving rating score and/or driving rating information 170 with a vehicle to inform vehicle occupants of the driving rating of other vehicles/drivers in the environment. For instance, the driving rating module(s) 130 can be configured to present or cause to be presented the driving rating score and/or driving rating information 170 with a vehicle in a visual manner and/or in an audible manner.

The driving rating module(s) 130 can be configured to determine a driving rating 180 for one or more of the nearby vehicles 150. The driving rating 180 can be determined in any suitable way, and it can be based on one or more parameters. In one or more arrangements, the driving rating 180 can be automatically determined by the driving rating module(s) 130 without any human input. In one or more arrangements, the driving rating 180 can be determined in part with input from a vehicle occupant. While FIG. 1 shows the driver rating 180 being sent by the vehicle 200, it will be understood that, alternatively or in addition, the driver rating 180 can be determined by and sent by one or more of the nearby vehicles 150.

Various parameters that can be used by the driving rating module(s) 130 to determine a driving rating 180. For instance, one parameter that can be used by the driving rating module(s) 130 to determine a driving rating is smoothness. Smoothness can include the number of times and/or the frequency at which a driver acutely brakes and/or acutely accelerates. The number of times that a driver acutely brakes and/or acutely accelerates, or the frequency of occurrence of such actions, may be indicative of whether or not a driver is a good driver. Generally, a good driver will make fewer (or less frequent) acute brakes and/or acute accelerations compared to a bad driver. The driving rating module(s) 130 can analyze data about a vehicle, which may be acquired by a sensor system (e.g., sensor system 220 in FIG. 2), to determine how many times or how frequently the leading or following vehicle acutely braked and/or acutely accelerated. Any suitable threshold quantity or quantities of acute brakes and/or acute accelerations can be used to determine the driving rating 180. Any suitable predetermined threshold frequency or frequencies of acute brakes and/or acute accelerations can be used to determine the driving rating 180.

Another parameter that can be used by the driving rating module(s) 130 to determine a driving rating is response time of a vehicle. The response time of a vehicle/driver in the event of a risk situation may be indicative of whether or not the driver is a good driver. Generally, a good driver is one that has a quick response time in the event of a risk situation. The driving rating module(s) 130 can analyze data about a vehicle, which may be acquired by a sensor system (e.g., sensor system 220 in FIG. 2), to determine the response time of the vehicle. Any suitable predetermined threshold response time(s) can be used to determine the driving rating 180.

Another example of a parameter that can be used by the driving rating module(s) 130 to determine a driving rating is exterior status of a vehicle. The exterior condition of the leading or following vehicle may be indicative of whether or not the driver is a good driver. Generally, the vehicle of a good driver will have little or no evident damage to the exterior of the vehicle and/or a generally well-kept vehicle exterior. In contrast, a vehicle with damage to the exterior or with a poorly-kept exterior may be indicative of a poor driver, a careless driver, or a driver that is prone to accidents. Examples of damage or poor upkeep of the vehicle exterior include dents, scratches, chips, holes, damage, cracked or broken window(s), cracked or broken windshield, missing parts (e.g., a missing side view mirror), dirty exterior, and/or inactive or broken lights (e.g., headlights, taillights, turn signal lights, etc.), just to name a few possibilities In one or more arrangements, the driving rating module(s) 130 can include vehicle condition recognition software. The vehicle condition recognition software can analyze visual or other data captured by a sensor system. The vehicle condition recognition software can query or access a vehicle condition image database for possible matches. Alternatively or in addition, measurements or other aspects of an image captured by a sensor system (e.g., sensor system 220 in FIG. 2) can be compared to measurements or other aspects of any images or vehicle data in the vehicle condition database. In one or more arrangements, the driving rating module(s) 130 can use template matching and other kinds of computer vision and/or image processing techniques and/or other artificial or computational intelligence algorithms or machine learning methods to detect or determine the condition of a leading or following vehicle.

Another example of a parameter that can be used by the driving rating module(s) 130 to determine a driving rating is hazardous movement of a vehicle. Hazardous movement or the amount of hazardous movement by a vehicle may be indicative of whether or not the driver is a good driver. Generally, a vehicle driven by a good driver will exhibit little or no hazardous movement. In contrast, a vehicle driven by a poor driver will exhibit hazardous movement or a greater amount of hazardous movement. Examples of hazardous movement include sharp driving maneuvers, crossing traffic lanes erratically, frequent lane changes, driving in more than one traffic lane, violating traffic rules, failing to use a turn signal, just to name a few possibilities. In one or more arrangements, the driving rating module(s) 130 can be configured to compare a detected movement of a vehicle (e.g., a leading or a following vehicle) to hazardous movement data to determine if the detected movement is identical or substantially identical or otherwise matches hazardous movement data. In one or more arrangements, the driving rating module(s) 130 can be configured to compare a detected movement of a vehicle to traffic rules data.

Another example of a parameter that can be used by the driving rating module(s) 130 to determine a driving rating is the amount of time and/or the distance that a vehicle has been followed or led by a rating vehicle. Such information can be included in the driving rating information 170. Vehicles that are followed/led for larger distances and/or greater amounts of time may be indicative of a good driver, which can favorably affect the driving rating. In contrast, vehicles that are followed/led for shorter distances and/or shorter amounts of time may be indicative or a poor driver, which can adversely affect the driving rating. In some instances, the amount of time and/or the distance that a nearby vehicle has been followed or led by the rating vehicle can be used for weighting the driving rating provided by the vehicle. For instance, a driving rating provided by a vehicle that has lead or followed another vehicle for a longer amount of time may be assigned a greater weight than a vehicle that has lead or followed the same vehicle for a relatively short period of time.

Again, the above parameters are provided merely as examples. It will be understood that the driving rating can be based on one or more of the above parameters. Further, it will be understood that the driving rating can be based in whole or in part on other parameters.

In some instances, the driving rating module(s) 130 can allow a driver to indicate one or more preferences. For instance, the driving rating module(s) 130 can be configured to allow a driver to indicate whether or not the driver wishes his or her vehicle to be followed or to be led by another vehicle. When the vehicle 200 requests driving rating information for one or more nearby vehicles 150, such preferences can be included with the driving rating information 170 provided to the vehicle 200. Thus, if a driver of the vehicle 200 is aware that one of the nearby vehicles 150 does not want to be lead or followed, then the driver can choose to avoid such vehicle(s).

The driving rating module(s) 130 can include limits on the number of ratings that a vehicle can provide to another vehicle. For instance, in one or more arrangements, the driving rating module(s) 130 can be configured to allow only one rating for each occasion that the rating vehicle is paired (e.g., leading or following) with another vehicle. Alternatively or in addition, the driving rating module(s) 130 can be configured to allow a vehicle to provide only one rating to another vehicle within a time period (e.g., once per day, once per week, etc.).

Figure 2:
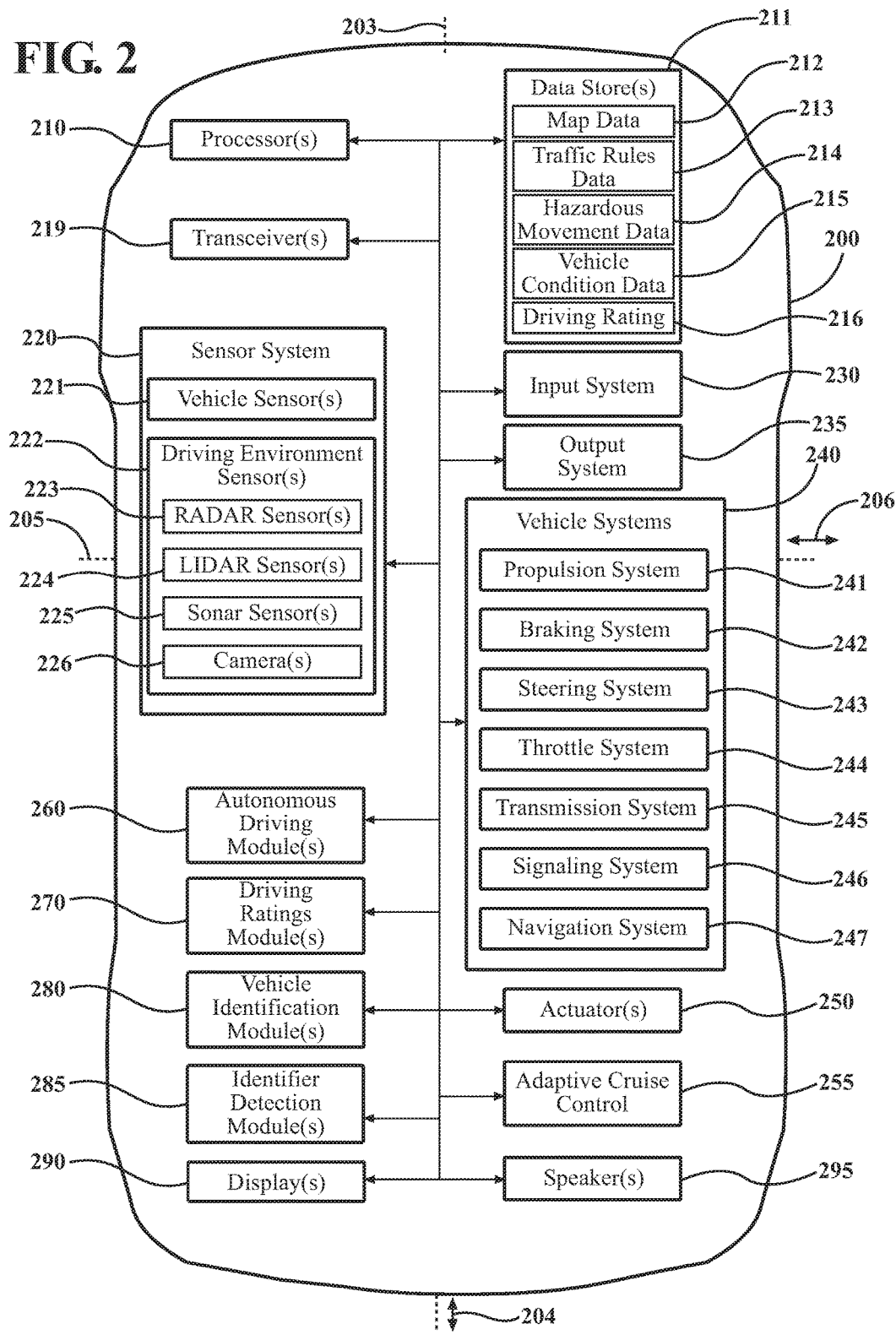
FIG. 2 is an example of a vehicle.

The vehicle 200 will now be described in greater detail. Referring to FIG. 2, an example of the vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport. Also, it should be noted that the description of the vehicle 200 can apply in whole or in part to one or more of the nearby vehicles 150.

In some instances, the vehicle 200 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 200 can be highly automated.

The vehicle 200 can have a plurality of autonomous operational modes. For instance, the vehicle 200 can have an unmonitored autonomous operational mode. "Unmonitored autonomous operational mode" means that one or more computing systems are used to navigate and/or maneuver the vehicle along a travel route with no input or supervision required from a human driver. As an example, the unmonitored autonomous operational mode can include Level 4 (L4), as defined by the National Highway Traffic Safety Administration in its Preliminary Statement of Policy Concerning Automated Vehicles (May 30, 2013) ("NHTSA 2013 Policy"), which is incorporated herein by reference. The vehicle 200 can have a monitored autonomous operational mode. "Monitored autonomous operational mode" means that one or more computing systems are used to navigate and/or maneuver the vehicle with at least some human driver supervision required. As an example, the monitored autonomous operational mode can include Level 3 or L3, as defined by the NHTSA 2013 Policy.

Alternatively or in addition to the above-described modes, the vehicle 200 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. As an example, the semi-autonomous operational mode can include Levels 2 (L2) and/or Level 1 (L1), as defined by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

Alternatively or in addition to the above-described modes, the vehicle 200 can have a manual operational mode. "Manual operational mode" means that a substantial majority or all of the navigation and/or maneuvering of the vehicle along a travel route is performed by a human driver with minimal or no input from a computing system. As an example, the manual operational mode can include Level 0 (L0), as defined by the NHTSA 2013 Policy.

The vehicle 200 can be configured to be switched between the various operational modes. Such switching can be implemented in any suitable manner, now known or later developed.

In some instances, the vehicle 200 may be a conventional vehicle. A conventional vehicle is not configured for autonomous driving. Thus, a conventional vehicle does not have an autonomous operational mode. However, a conventional vehicle may have one or more semi-autonomous modes or features (e.g., cruise control, adaptive cruise control, lane keeping, etc.). However, in one or more arrangements, the conventional vehicle may not have semi-autonomous mode(s) or feature(s). In some instances, a conventional vehicle may be operable in only a manual operational mode. It will be appreciated that arrangements described herein are applicable to autonomous vehicles operating in any of the above-described modes, conventional vehicles, and/or other types of vehicles.

The vehicle 200 can have an associated longitudinal axis 203, which can be the central axis of the vehicle 200. The vehicle 200 can have an associated longitudinal direction 204. "Longitudinal direction" means any direction that is substantially parallel to and/or co-linear with the longitudinal axis 203. The vehicle 200 can have an associated lateral axis 205, which can be substantially perpendicular to the longitudinal axis 203. As used herein, the term "substantially" includes exactly the term it modifies and slight variations therefrom. Thus, the term "substantially perpendicular" means exactly perpendicular and slight variations (e.g., within normal manufacturing tolerances) therefrom. The vehicle 200 can have an associated lateral direction 206. "Lateral direction" means any direction that is substantially parallel to and/or co-linear with the lateral axis 205.

The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, the vehicle 200 may not include one or more of the elements shown in FIG. 2. Further, while the various elements are shown as being located within the vehicle 200 in FIG. 2, it will be understood that one or more of these elements can be located external to the vehicle 200. Further, the elements shown may be physically separated by large distances.

The vehicle 200 can include one or more processors 210. The one or more processors 210 can be the one or more processors 110 described above in connection with FIG. 1, and such description applies equally to the processor(s) 210. In one or more arrangements, the processor(s) 210 can be a main processor of the vehicle 200. For instance, the processor(s) 210 can be an electronic control unit (ECU).

The vehicle 200 can include one or more data stores 211 for storing one or more types of data. The one or more data stores 211 can be the one or more data stores 120 described above in connection with FIG. 1, and such description applies equally to the data store(s) 211.

In one or more arrangements, the one or more data stores 211 can include map data 212. The map data 212 can include maps of one or more geographic areas. The map data 212 can include information or data on roads, traffic control devices, road markings, structures, features, and/or landmarks in the one or more geographic areas. The map data 212 can be in any suitable form. In some instances, the map data can include aerial views of an area. In some instances, the map data 212 can include ground views of an area, including 360 degree ground views. The map data 212 can include measurements, dimensions, distances, and/or information for one or more items included in the map data and/or relative to other items included in the map data 212. The map data 212 can include a digital map with information about road geometry. The map data 212 can be high quality and/or highly detailed.

In one or more arrangements, the one or more data stores 211 can include traffic rules data 213. The traffic rules data 213 can include one or more traffic rules. As used herein, "traffic rule" is any law, rule, ordinance or authority that governs the operation of a motor vehicle, including motor vehicles in motion and motor vehicles that are parked or otherwise not in motion. The traffic rules data 213 can include international, federal, national, state, city, township and/or local laws, rules, ordinances and/or authorities.

In one or more arrangements, the one or more data stores 211 can include hazardous movement data 214. The hazardous movement data 214 include one or more examples of vehicular movement indicative of hazardous driving. For instance, the hazardous movement data 214 can include swerving motions (such as may occur when an oncoming object is being operated by an intoxicated, drowsy and/or distracted driver), sharp acceleration, sharp deceleration, crossing traffic lanes erratically, and/or frequent lane changes, just to name a few possibilities.

In one or more arrangements, the one or more data stores 211 can include vehicle condition data 215. The vehicle condition data 215 include one or more examples of the exterior condition of a vehicle that may be indicative of a careless or poor driver. For instance, the vehicle condition data 215 can include dents, holes, damage, cracked or broken window(s), cracked or broken windshield, missing parts (e.g., a missing side view mirror), dirty exterior, and/or inactive or broken lights (e.g., headlights, taillights, turn signal lights, etc.), just to name a few possibilities.

In one or more arrangements, the one or more data stores 211 can include driving rating information 216 for the vehicle 200. The driving rating information 216 can include driving ratings of the vehicle 200 provided by other drivers. However, in some instances, such driving rating information may not be stored onboard the vehicle 200. The driving rating information 216 may include preferences of the driver of the vehicle 200, such as a desire not to be followed by other vehicles or not to be led by other vehicles. The driving rating information 216 may also include a unique identifier for the vehicle 200, which can be used by the nearby vehicle(s) 150 to identify the vehicle 200.

The vehicle 200 can include one or more transceivers 219. As used herein, "transceiver" is defined as a component or a group of components that transmit signals, receive signals or transmit and receive signals, whether wirelessly or through a hard-wired connection. The one or more transceivers 219 can be operatively connected to the one or more processors 210 and/or the one or more data stores 211. The one or more transceivers 219 can enable communications between the vehicle 200 and other elements of the system 100. The one or more transceivers 219 can be any suitable transceivers used to access a network, access point, node or other device for the transmission and receipt of data.

The one or more transceivers 219 may be wireless transceivers using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 219 can include any wireless technology developed in the future. Again, the one or more transceivers 219 can be any suitable combination of transceivers, including any combination of the transceivers noted above.

The vehicle 200 can include a sensor system 220. The sensor system 220 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor(s) 210, the data store(s) 211, and/or other element of the vehicle 200 (including any of the elements shown in FIG. 2). The sensor system 220 can acquire data of at least a portion of the external environment of the vehicle 200.

The sensor system 220 can include any suitable type of sensor. Various examples of different types of sensors will be described herein. However, it will be understood that the embodiments are not limited to the particular sensors described.

The sensor system 220 can include one or more vehicle sensors 221. The vehicle sensor(s) 221 can be configured to detect, determine, assess, monitor, measure, quantify and/or sense information about the vehicle 200 itself. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system, and/or other suitable sensors.

Alternatively or in addition, the sensor system 220 can include one or more driving environment sensors 222. The driving environment sensors 222 can be configured to acquire, detect, determine, assess, monitor, measure, quantify and/or sense driving environment data. "Driving environment data" includes and data or information about the external environment in which a vehicle is located or one or more portions thereof. For example, the driving environment sensors can be configured to detect, determine, assess, monitor, measure, quantify and/or sense, directly or indirectly, the presence of one or more objects in the external environment of the vehicle 200 and/or information/data about such objects (e.g., the position of each detected object relative to the vehicle 200, the distance between each detected object and the vehicle 200 in one or more directions, the speed of each detected object and/or the movement of each detected object). Examples of driving environment sensors can include RADAR sensor(s) 223, LIDAR sensor(s) 224, sonar sensor(s) 225, and/or camera(s) 226. The camera(s) 226 can be configured to capture visual data. "Visual data" includes video and/or image information/data. The camera(s) 226 can be high resolution cameras. The camera(s) 226 can capture visual data in any suitable wavelength on the electromagnetic spectrum.

The vehicle 200 can include an input system 230. An "input system" includes any device, component, system, element or arrangement or groups thereof that enable information/data to be entered into a machine. The input system 230 can receive an input from a vehicle occupant (e.g. a driver or a passenger). Any suitable input system 230 can be used, including, for example, a keypad, display, touch screen, multi-touch screen, button, joystick, mouse, trackball, microphone and/or combinations thereof.

The vehicle 200 can include an output system 235. An "output system" includes any device, component, system, element or arrangement or groups thereof that enable information/data to be presented to a vehicle occupant (e.g. a person, a vehicle occupant, etc.). The output system 235 can present information/data to a vehicle occupant. The output system 235 can include one or more displays. Alternatively or in addition, the output system 235 may include a microphone, earphone and/or speaker. Some components of the vehicle 200 may serve as both a component of the input system 230 and a component of the output system 235.

According to arrangements herein, the output system 235 can be configured to present driving rating information to a vehicle occupant. In one or more arrangements, driving rating information can be presented visually to a vehicle occupant. For instance, the output system 235 can include one or more displays 290. "Display" is defined as a component or a group of components that present information/data in a form that is perceptible to the human sense of sight. For instance, the display 290 can present video, images, graphics, etc. The display 290 can be any suitable type of display. For instance, the display 290 can be a liquid crystal display (LCD), a light emitting diode (LED) display or some other suitable display. In one or more arrangements, the display 290 can be a heads-up display, a display for a navigation system, and/or a display included in an instrument cluster. The display(s) 290 can be provided in any suitable location within the vehicle 200. In one or more arrangements, the display(s) 290 can be located in a front interior portion of the vehicle 200. As an example, the display(s) 290 can be included in a dashboard or instrument panel (not shown) of the vehicle 200. The display(s) 290 can include a touch screen to allow a vehicle occupant to provide inputs or selections by engaging the screen with a finger, hand, stylus, or other implement.

Alternatively or in addition, driving rating information can be presented audibly to a vehicle occupant. For instance, the output system 235 can include one or more speakers 295. "Speaker" means one or more elements, one or more devices, one or more components, one or more systems, and/or any combination thereof that produce sound in response to an audio signal input. Examples of speakers include, for example, electroacoustic transducers, sound chips, and sound cards The vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 211 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 200 can include one or more autonomous driving modules 260. The autonomous driving module(s) 260 can receive data from the sensor system 220 and/or any other type of system capable of capturing information relating to the vehicle 200 and/or the external environment of the vehicle 200. In one or more arrangements, the autonomous driving module(s) 260 can use such data to generate one or more driving scene models. The autonomous driving module(s) 260 can determine position and velocity of the vehicle 200. The autonomous driving module(s) 260 can determine the location of obstacles, objects, or other environmental features including traffic signs, trees, shrubs, neighboring vehicles, pedestrians, etc.

The autonomous driving module(s) 260 can be configured to receive, capture, and/or determine location information for objects within the external environment of the vehicle 200 for use by the processor(s) 210, and/or one or more of the modules described herein to estimate position and orientation of the vehicle 200, vehicle position in global coordinates based on signals from a plurality of satellites, or any other data and/or signals that could be used to determine the current state of the vehicle 200 or determine the position of the vehicle 200 in respect to its environment for use in either creating a map or determining the position of the vehicle 200 in respect to map data.

The autonomous driving module(s) 260 can be configured to determine travel path(s), current driving maneuvers for the vehicle 200, future driving maneuvers and/or modifications to current autonomous driving maneuvers based on data acquired by the sensor system 220, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 200, changing travel lanes, merging into a travel lane, and/or reversing, just to name a few possibilities. The autonomous driving module(s) 260 can be configured can be configured to implement determined driving maneuvers. The autonomous driving module(s) 260 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 260 can be configured to execute various vehicle functions and/or to transmit data to, receive data from, interact with, and/or control the vehicle 200 or one or more systems thereof (e.g. one or more of vehicle systems 240).

The vehicle 200 can include one or more driving rating modules 270. The one or more driving rating modules 270 can be the one or more driving rating modules 130 described above in connection with FIG. 1, and such description applies equally to the driving rating module(s) 270.

The vehicle 200 can include one or more vehicle identification module(s) 280. The vehicle identification module(s) 280 can be configured to determine whether a detected object in the external environment of the vehicle 200 is a vehicle. For instance, the vehicle identification module(s) 280 can analyze, review, or otherwise process information/data received from one or more sensors of the sensor system 22-. In some arrangements, the vehicle identification module(s) 280 can be configured to identify the nature of the objects (e.g., whether the object is a vehicle) using any suitable technique, including, for example, template matching and other kinds of computer vision and/or image processing techniques and/or other artificial or computational intelligence algorithms or machine learning methods.

As an example, the vehicle identification module(s) 280 can include and/or have access to an object image database (not shown). The objects image database can include one or more images of a plurality of different objects (e.g., vehicles) or portions thereof. The images may be of one or more portions of the exterior of at least a portion of a plurality of different vehicles. For instance, the images can be of at least a portion of a vehicle. The images can be provided in any suitable format. The vehicle image database can be located on-board the vehicle 200, such as in the data store 211, or it can be located in a source external to the vehicle 200 (e.g., in a cloud-based data store or server).

The vehicle identification module(s) 280 can include any suitable vehicle recognition software or other object recognition software. The vehicle recognition software can analyze visual or other data captured by the sensor system 220. The vehicle recognition software can query the vehicle image database for possible matches. For instance, images captured by the sensor system 220 can be compared to images in the vehicle image database for possible matches. Alternatively or in addition, measurements or other aspects of an image captured by the sensor system 220 can be compared to measurements or other aspects of any images in the vehicle image database. The vehicle identification module(s) 280 can identify the detected object as a particular type of vehicle if there is a match between the captured image and an image in the vehicle database.

In this context, "match" or "matches" means that an image or other information collected by the sensor system and one or more of the images in the vehicle database are substantially identical. For instance, the an image or other information collected by the sensor system and one or more of the images in the vehicle database can match within a predetermined probability (e.g., at least about 85%, at least about 90%, at least about 95% or greater) or confidence level.

The autonomous driving module(s) 260, the vehicle identification module(s) 280, and/or the processor 210 can be configured to analyze data/information, including visual data, captured by the sensor system 220 to identify one or more objects in the external environment of the vehicle 200. In some arrangements, one or more of these elements can be configured to identify the nature of the objects (e.g., whether the object is a vehicle) using any suitable technique, including, for example, template matching and other kinds of computer vision and/or image processing techniques and/or other artificial or computational intelligence algorithms or machine learning methods.

The vehicle can include one or more identifier detection modules 285. The identifier detection module(s) 285 can be configured to detect an identifying information for nearby vehicles detected in the external environment so that the vehicle 200 may obtain driving rating information for the detected vehicles. The identifier detection module(s) 285 can be configured to analyze, assess and/or interpret information about a detected vehicle in the external environment of the vehicle 200. Thus, the identifier detection modules 285 can be configured to detect and/or recognize identifiers of a vehicle. Examples of identifiers include a license plate, a VIN (vehicle identification number), an identifier signal transmitted by a detected vehicle, bar code, QR code, or other unique identifier. When an identifier is detected, such information can be used by the driving rating module(s) 270 to request driving information associated with the identifier.

While the various modules are shown and described as being separate modules, it will be understood that arrangements are not limited in this regard. Indeed, the modules can be a single module, or two or more of the modules or portions thereof can be combined in any suitable manner.

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more mechanisms, devices, elements, components, systems, and/or combination thereof, now known or later developed The processor(s) 210 and/or the autonomous driving module(s) 260 can be operatively connected to communicate with the various vehicle systems 240 and/or individual components thereof. For example, the processor(s) 210 and/or the autonomous driving module(s) 260 can be in communication to send and/or receive information from the various vehicle systems 240 to control the movement, speed, maneuvering, heading, direction, etc. of the vehicle 200. The processor(s) 210 and/or the autonomous driving module(s) 260 may control some or all of these vehicle systems 240 and, thus, may be partially or fully autonomous.

The processor(s) 210 and/or the autonomous driving module(s) 260 may be operable to control the navigation and/or maneuvering of the vehicle 200 by controlling one or more of the vehicle systems 240 and/or components thereof. For instance, when operating in an autonomous mode, the processor(s) 210 and/or the autonomous driving module(s) 260 can control the direction and/or speed of the vehicle 200. The processor(s) 210 and/or the autonomous driving module(s) 260 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels).

In some instances, such as when the vehicle 200 is an autonomous vehicle, the vehicle 200 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator can be used. For instance, the one or more actuators 250 can include motors, pneumatic actuators, hydraulic pistons, relays, solenoids, and/or piezoelectric actuators, just to name a few possibilities. However, when the vehicle 200 is a conventional vehicle, the vehicle 200 may or may not include the one or more actuators 250.

The vehicle 200 can include an adaptive cruise control system 255. The adaptive cruise control system 255 can include one or more components, systems, modules, devices, and/or elements that can be activated to maintain a minimum distance between the vehicle 200 and a leading vehicle. The adaptive cruise control system 255 can also attempt to maintain a speed set by the driver. The adaptive cruise control system 255 can automatically control and/or adjust the speed of the vehicle 200 to maintain the minimum distance from a leading vehicle based on data received from the sensor system 220. When the adaptive cruise control system 255 is in use, the vehicle may otherwise be operated manually by a human driver (e.g., steering). Upon receiving a driver input to alter the speed of the vehicle (e.g. by depressing the brake pedal to reduce the speed of the vehicle), the adaptive cruise control system 255 can be deactivated and the speed of the vehicle 200 becomes manually controlled. The adaptive cruise control system 255 can include one or more user interface elements to enable a vehicle occupant (e.g., a driver) to selectively activate and deactivate the adaptive cruise control system 255. The adaptive cruise control system 255 can be any adaptive cruise control system, now known or later developed.

According to arrangements herein, the vehicle 200 can be configured to provide a vehicle occupant (e.g., the driver) with driving rating information. The driving rating information can be provided in any suitable manner, such as visually and/or audibly. Based on the presented driving rating information, a vehicle occupant can select which, if any, of the vehicles that it would like for the vehicle 200 to be operated relative to. For example, the vehicle occupant can select which of the nearby vehicle(s) 150 that it wishes for the vehicle 200 to follow. As another example, the vehicle occupant can select which of the nearby vehicle(s) 150 that it wishes for the vehicle 200 to lead.

In one arrangements, when a vehicle occupant activates the adaptive cruise control system 255, the vehicle can automatically acquire and/or present the driving rating information for nearby leading vehicles. Based at least in part on the driving rating information, the vehicle occupant can decide whether or not to use the adaptive cruise control and/or which leading vehicle should be followed when the adaptive cruise control is implemented. Further, the driving rating information can be used to alter, modify, or adjust the distance at which the vehicle 200 follows the leading vehicle. For instance, if the selected vehicle has a poor rating, a larger following distance can be employed. However, if the selected vehicle has a good rating, the default following distance or even a shorter following distance can be employed.

Figure 3:
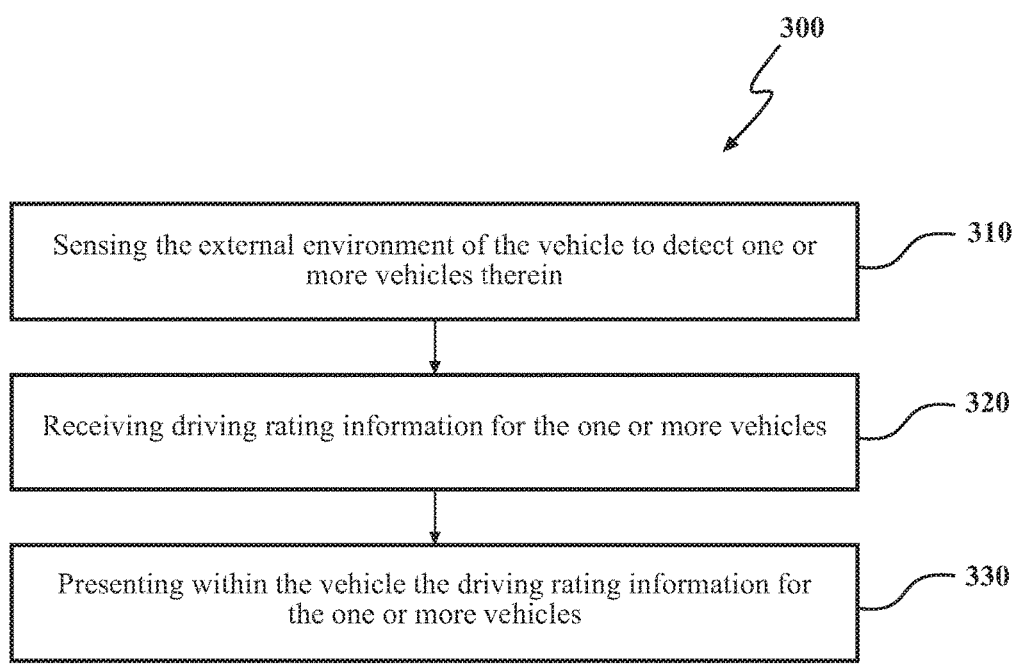
FIG. 3 is a method of providing driving rating information.

Now that the various potential systems, devices, elements and/or components of the vehicle 200 have been described, various methods of method of providing driving rating information will now be described. Referring now to FIG. 3, an example of a method of method of providing driving ratings for a vehicle is shown. Various possible steps of method 300 will now be described. The method 300 illustrated in FIG. 3 may be applicable to the embodiments described above in relation to FIGS. 1 and/or 2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, the external environment of the vehicle 200 can be sensed to detect one or more nearby vehicles 150 therein. The sensing can be performed using one or more sensors of the sensor system 220. For instance, the sensing can be performed by one or more driving environment sensors 222 (e.g., one or more RADAR sensors 223, the one or more LIDAR sensors 224, the one or more sonar sensors 225, the one or more cameras 226, and/or one or more other driving environment sensors). The sensing can be performed continuously, periodically, irregularly, randomly, or responsive to a vehicle occupant command or other input. The method 300 can continue to block 320.

At block 320, driving rating information 170 for the one or more nearby vehicles 150 can be received. The driving rating information 170 can be received by, for example, the transceiver(s) 219, a communications unit, or other element of the vehicle 200. The driving rating information 170 can be received from one or more suitable driving rating information sources 140. For instance, the driving rating information 170 can be received directly from the one or more nearby vehicles 150. Alternatively or in addition, the driving rating information 170 can be received from a remote rating server. The driving rating information 170 can be received continuously, periodically, irregularly, or randomly. In one or more arrangements, the driving rating information 170 can be received automatically when an identifier for one or more of the nearby vehicles 150 is acquired. In one or more arrangements, the driving rating information 170 can be received in response to a request sent by the vehicle 200 or in response to a vehicle occupant command. The method can continue to block 330.

At block 330, the received driving rating information 170 for the one or more nearby vehicles 150 can be presented or can be caused to be presented within the vehicle 200. Such causing can be performed by one or more elements of the vehicle 200, such as the driving ratings module(s) 130 and/or the processor(s) 210. The received driving rating information 170 can be presented on one or more elements of the output system 235, such as on one or more displays 290 and/or one or more speakers 295. The received driving rating information 170 can be presented in the form received, or it can be presented in a different form.

The method 300 can end. Alternatively, the method 300 can return to block 310. In one or more arrangements, the method 300 (or any one or more of the above-described blocks thereof) can be performed in response to receiving an input from a vehicle occupant to activate the adaptive cruise control system 255. In this way, the vehicle occupant can decide whether or not to continue with the use of the adaptive cruise control system 255 based on the presented driving rating information.

The method 300 can include additional and/or alternative blocks (not shown). For instance, in one or more arrangements, the method 300 can include receiving an input corresponding to a selection of one of the identified vehicles. The selection can be made by a vehicle occupant (e.g., a driver). Alternatively, the selection can be made automatically by the vehicle 200. The selection can be based on the received driving rating information for the one or more vehicles. For instance, a vehicle occupant and/or the vehicle 200 can select the vehicle with the highest average driving rating information, or any vehicle with an average driving rating that is above a predetermined threshold (e.g., a driving rating of a B or better, three out of five stars or better, etc.) Alternatively, if none of the driving rating of the one or more vehicles is greater than a predetermined driving rating threshold, then a vehicle occupant and/or the vehicle 200 may not select any of the vehicle(s).

The method 300 can also include causing the vehicle to implement one or more driving maneuvers relative to the selected vehicle. The method 300 can include causing the vehicle 200 to implement the one or more driving maneuvers relative to the selected vehicle can be made by the driving ratings module(s) 130, the autonomous driving module(s) 260, and/or the processor(s) 210, which can send control signals directly to one or more vehicle systems 240 or to one or more actuators 250 to control one or more vehicle systems 240.

Any suitable one or more driving maneuvers can be implemented. As an example, when the selected vehicle is a leading vehicle, the one or more driving maneuvers can be made relative to the selected vehicle such that the vehicle 200 follows the selected vehicle. Such maneuvers may include a lane change, accelerating, decelerating, and/or movement of the vehicle 200 in the lateral direction 206. The one or more driving maneuvers can include maintaining a minimum following distance between the leading vehicle and the vehicle 200. As an alternative example, when the selected vehicle is a trailing vehicle, the one or more driving maneuvers can be made relative to the selected vehicle such that the vehicle 200 leads the selected vehicle. Such maneuvers may include a lane change, accelerating, decelerating, and/or lateral movement of the vehicle 200. The one or more driving maneuvers can include maintaining a minimum leading distance between the vehicle 200 and the trailing vehicle.

Various non-limiting examples of providing driving ratings for a vehicle 200 will now be described. A non-limiting example of will now be described in relation to FIGS. 4-6. For purposes of this example, the vehicle 200 can be traveling in an environment 400. The vehicle 200 can be traveling on a road 405. For this example, the road 405 can include a first travel lane 410, a second travel lane 420, and a third travel lane 430. For purposes of this example, vehicles in the travel lanes 410, 420, 430 can move in or can be designated to move in a travel direction 440. While FIGS. 4-5 show an example in which the road 405 includes three travel lanes, it will be understood that arrangements described herein are not limited to roads having three travel lanes.

Figure 4:
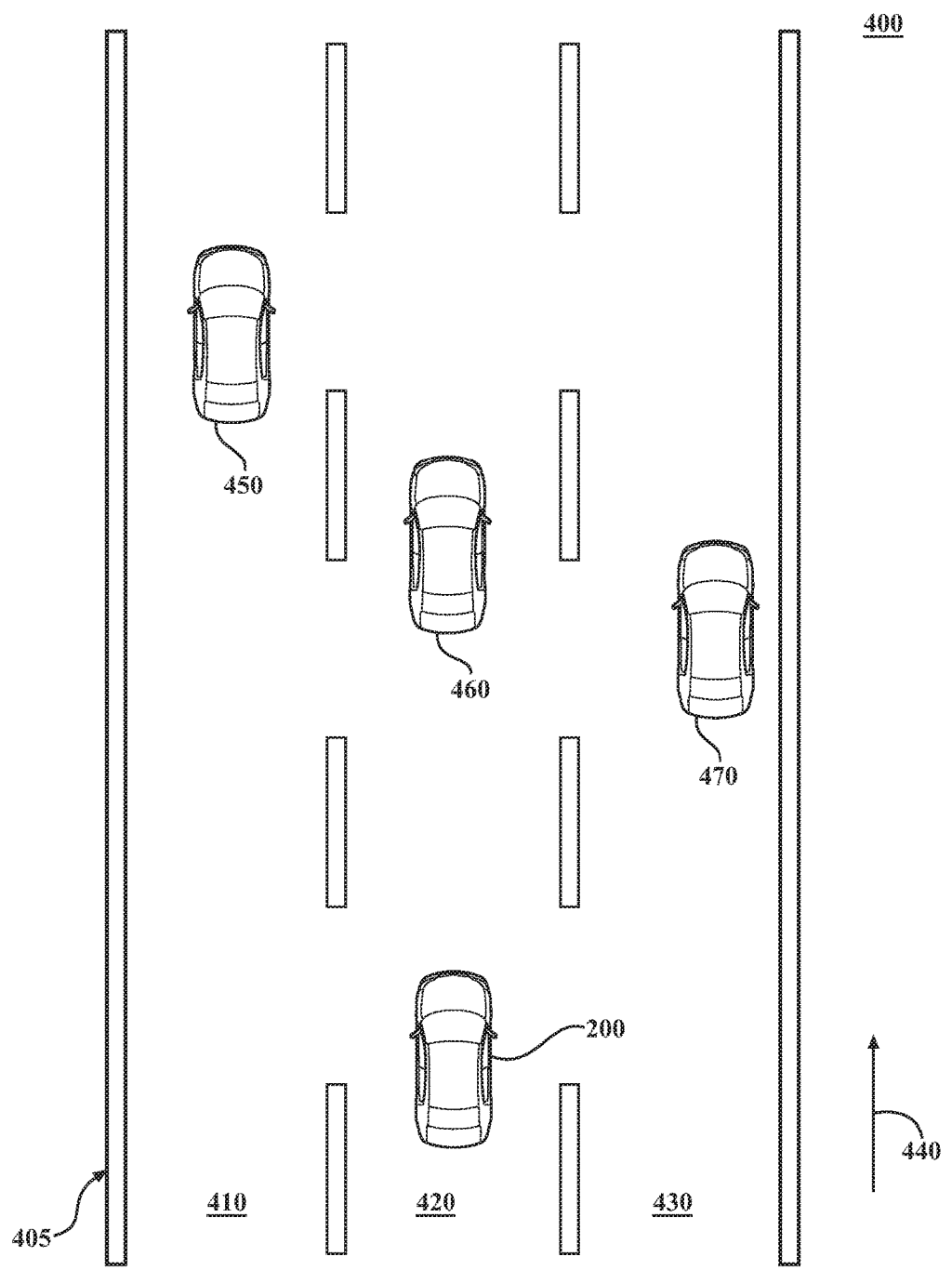
FIG. 4 is an example of a scenario in which the vehicle encounters a plurality of leading vehicles.
Figure 5:
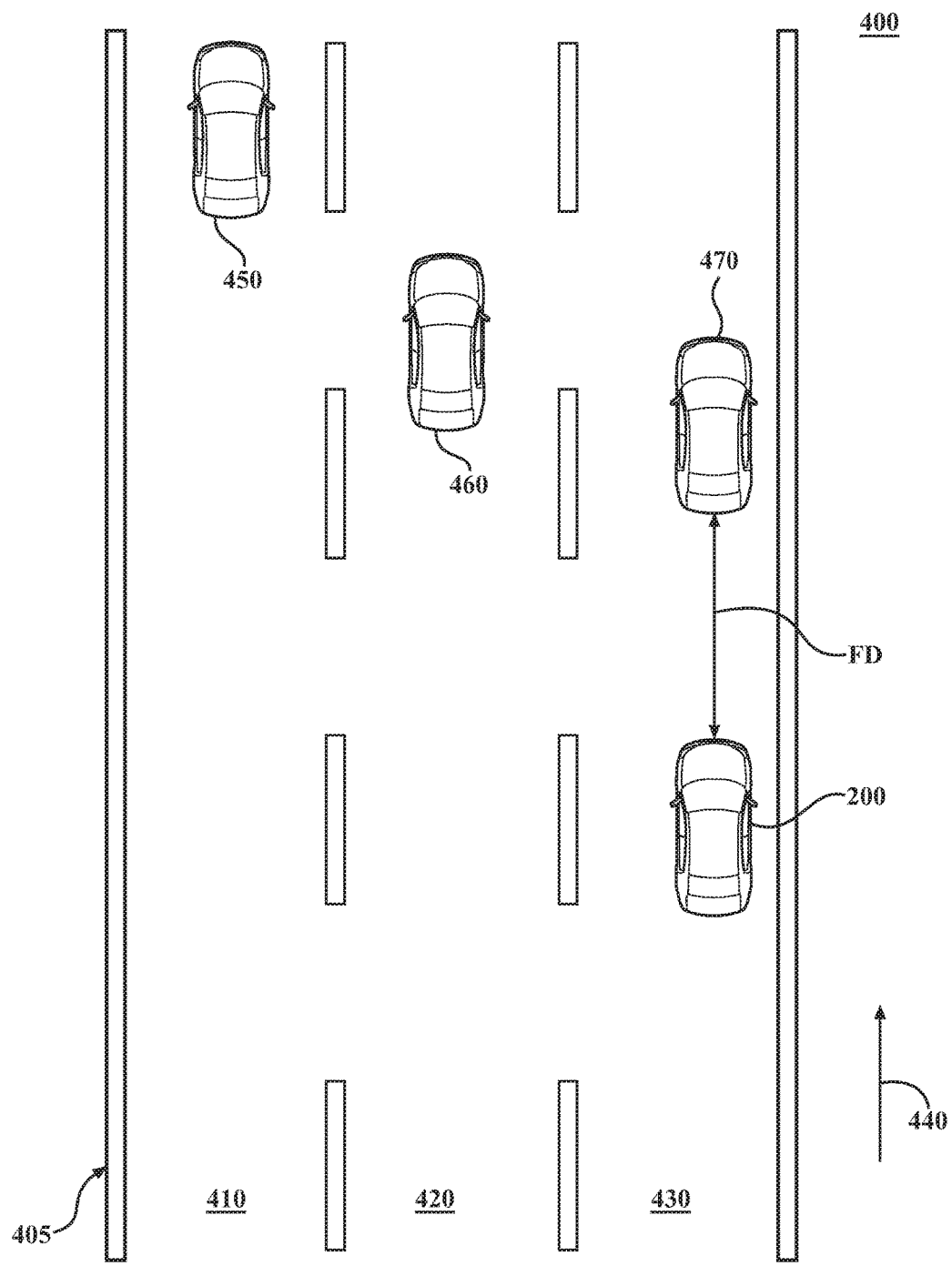
FIG. 5 is an example of the scenario of FIG. 4 at a subsequent moment in time, wherein the vehicle as has implemented a driving maneuver to follow a selected one of the leading vehicles.

At the moment shown in FIG. 4, the current travel lane of the vehicle 200 can be located in the second travel lane 420. The vehicle 200 can sense the environment 400, such as by using one or more driving environment sensors 222 of the sensor system 220. The vehicle 200 can detect the presence of one or more objects (e.g., vehicles 450, 460, 470) in the environment 400. In some instances, the vehicle 200 can determine that the detected object(s) are vehicles based on one or more factors. For instance, the vehicle identification module(s) 280 and/or the processor(s) 210 can review, assess, analyze, and/or process data about the objects, as acquired by the driving environment sensors 222. For purposes of this example, the vehicles 450, 460, 470 are leading vehicles. A "leading vehicle" is a vehicle that is located forward of a reference vehicle (e.g., vehicle 200) relative to the travel direction of the road. The vehicles 450, 460, 470 and the vehicle 200 can be moving substantially in the travel direction 440.

An identifier for each of the vehicles 450, 460, 470 can be detected. Such identifying can be performed in any suitable manner. For instance, data about the vehicles 450, 4670, 470 can be acquired by the sensor system 220. The acquired data can be analyzed, by the identifier detection module(s) 285 and/or the processor(s) 210, to detect a vehicle identifier (e.g., a license plate number, VIN, etc.). For instance, visual data acquired by the camera(s) 226 can be analyzed to detect a license plate. The identifier can be detected in other ways. As an example, one or more of the vehicles 450, 460, 470 can transmit a vehicle identifier to the vehicle 200. For instance, one or more of the vehicles 450, 460, 470 can transmit a signal beacon on any suitable basis (e.g., continuously, periodically, irregularly, etc.).

Driving rating information for the one or more of the vehicles 450, 460, 470 can be obtained by the vehicle 200. For instance, the vehicle 200 can send a request for driving rating information to one or more driving rating information sources 140. The request can include one or more vehicle identifiers to facilitate obtaining the correct driving rating information. The driving rating information can be received from any suitable source. In one or more arrangements, the driving rating information can be received directly from the one or more vehicles in the external environment. Alternatively or in addition, the driving rating information can be received from remote rating server(s) and/or data store(s).

The vehicle 200 can be configured to present or cause to be presented the driving rating information within the vehicle 200. For purposes of this example, the driving rating information can be presented in a visual manner. The driving rating information can be presented on a display within the vehicle 200.

Figure 6:
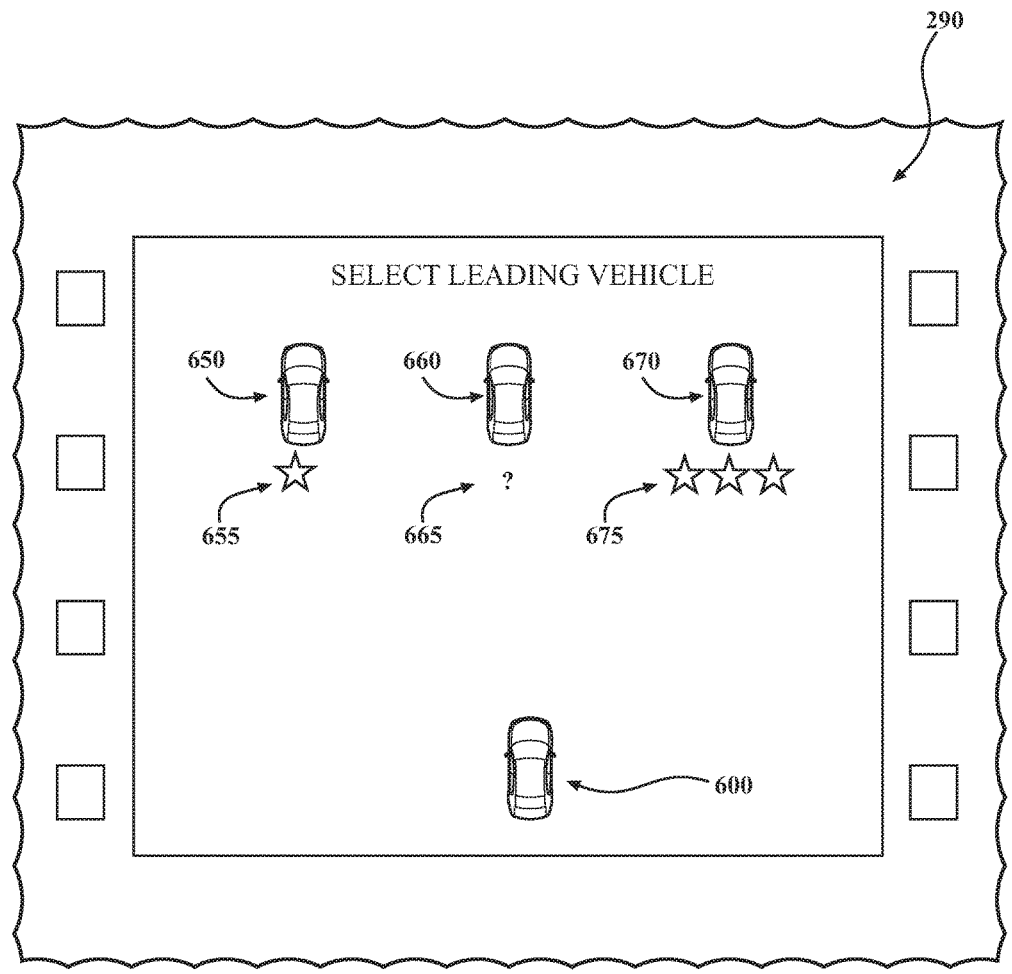
FIG. 6 is an example of a display presenting driving rating information with respect to the plurality of leading vehicles.

One example of the driving rating information presented on a display 290 is shown in FIG. 6. The driving rating information can be presented in a user-friendly format. For instance, a graphical representation 600 of the vehicle 200 and/or graphical representations 650, 660, 670 of the one or more vehicles 450, 460, 470 in the surrounding environment. There may also be graphical representation of the road and/or the travel lanes (not shown). The graphical representation 650, 660, 670 of the other vehicles in the surrounding environment can be arranged on the display 290, relative to each other and/or relative to the graphical representation 600 of the vehicle 200, in a manner that generally corresponds to their actual relative locations.

The driving rating information for each vehicle 450, 460, 470 can be associated with the respective graphical representation 650, 660, 670 in any suitable manner. In the example shown, the driving rating information 655, 665, 675 can be presented directly below the graphical representation 650, 660, 670 of the respective vehicle 450, 460, 470. In some instances, the driving rating information 655, 665, 675 can be updated dynamically in real-time.

In this example, the driving rating information is presented as a number of stars. A greater number of stars can indicate a more favorable rating. However, it will be understood that arrangements are not limited to presenting driving rating information in this format. In some instances, driving rating information may not be available for a vehicle, such as due to no prior ratings, an inability access or receive the driving rating information, an/or for any other reason. In such instances, a suitable indicator can be provided as to such status. In this example, the driving rating information for the vehicle 460 is not available. Accordingly, a question mark 665 or other indicator can be used as the driving rating indicator to reflect this status.

A vehicle occupant (e.g., a driver) can view the rating information. The vehicle occupant can select one of the vehicles 450, 460, 470 that it wishes the vehicle 200 to follow. The selection can be made in any suitable manner. For instance, when the display 290 is a touch screen display, the vehicle occupant can select the desired vehicle by pressing the graphical representation 650, 660, 670 corresponding to the of the selected vehicle on the screen using a finger, stylus, or other implement. Alternatively, the vehicle occupant can provide an audible input, indicating which one of the vehicles 450, 470, 470 is selected. For purposes of this example, the vehicle occupant selects the vehicle 470 because it has the highest rating.

In response to receiving the selection, the vehicle 200 can be caused to implement one or more driving maneuvers relative to the vehicle 470. In this example, since the selected vehicle 470 is a leading vehicle, the vehicle 200 can be caused to follow the selected vehicle 470. Referring to FIG. 5, the vehicle 200 can be caused to switch travel lanes from the second travel lane 420 to the third travel lane 430. The autonomous driving module(s) 260 and/or the processor(s) 210 can send a signal to one or more actuators 250 and/or one or more vehicle systems 240 to implement appropriate driving maneuvers.

The vehicle 200 can follow the selected vehicle 470 at a predetermined following distance FD. In one or more arrangements, the predetermined following distance FD can be a fixed distance. In one or more arrangements, the predetermined following distance FD can be variable based at least in part on the driving rating information associated with the selected vehicle 470. For instance, if the driving rating of the selected vehicle 470 is above a predetermined driving rating threshold (e.g., three stars or greater or any other threshold), the predetermined following distance FD can be set to a first distance. If the driving rating of the selected vehicle 470 is below the predetermined driving rating threshold, the predetermined following distance FD can be set to a second distance. The second distance can be greater than the first distance.

In some instances, a vehicle occupant may not select any of the vehicles 450, 460, 470 to follow. In such case, the vehicle 200 can continue to be operated as it is currently being operated. Alternatively, if no selection is received, a special mode can be implemented. In the special mode, the vehicle 200 can automatically select one of the vehicles 450, 460, 470 based on the driving rating information for the vehicles 450, 460, 470. Such selection can be performed by the driving ratings module(s) 270, the autonomous driving module(s) 260, and/or the processor(s) 210. In some stances, the vehicle 200 may prompt the vehicle occupant for approval.

Another non-limiting example of will now be described in relation to FIGS. 7-9. Again, the vehicle 200 can be traveling on the road 705 in the environment 700. The above discussion with respect to the environment 400, the road 405, the travel lanes 410, 420, 430, and the vehicles 450, 460, 470 can apply equally to the environment 700, the road 705, the travel lanes 710, 720, 730, and the vehicles 750, 760, 770.

Figure 7:
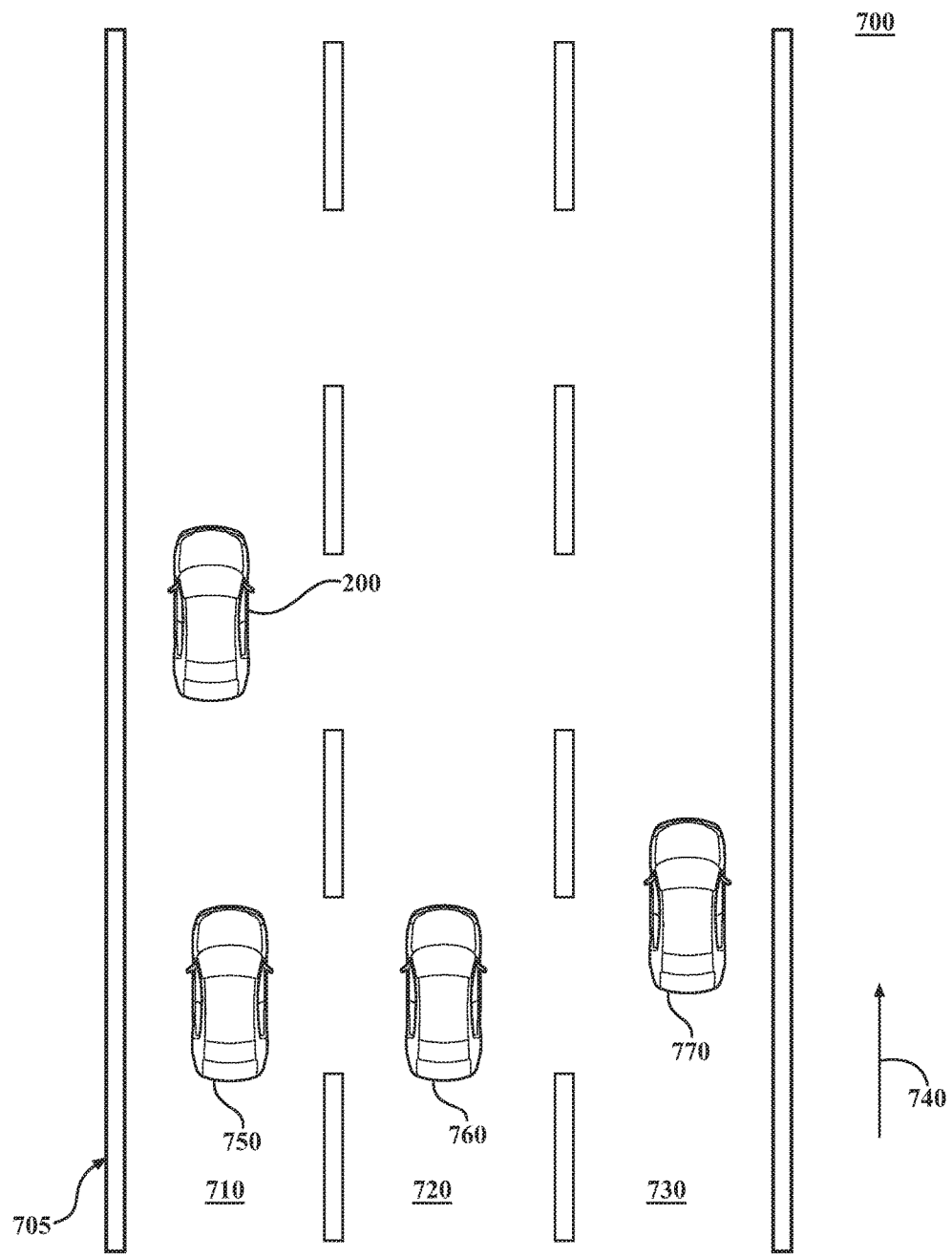
FIG. 7 is an example of a scenario in which the vehicle encounters a plurality of following vehicles.

At the moment shown in FIG. 7, the current travel lane of the vehicle 200 can be the second travel lane 720. The vehicle 200 can sense the environment 700, such as by using one or more sensors of the sensor system 220. The vehicle 200 can detect the presence of one or more objects (e.g., one or more vehicles 750, 760, 770) in the external environment. In some instances, the vehicle 200 can determine that the detected object(s) are vehicles based on one or more factors. For instance, the vehicle identification module(s) 280 and/or the processor(s) 210 can review, assess, analyze, and/or process data about the objects, as acquired by the driving environment sensors 222. For purposes of this example, the one or more vehicles 750, 760, 770 are trailing vehicles. A "trailing vehicle" is a vehicle that is located rearward the present vehicle (e.g., vehicle 200) relative to the travel direction 740 of the road 705. The vehicles 750, 760, 770 and the vehicle 200 can be moving substantially in the travel direction 740.

The one or more vehicles 750, 760, 770 can be identified and/or an identifier for each of the vehicles 750, 760, 770 can be detected. Driving rating information for the one or more of the vehicles 450, 460, 470 can be obtained by the vehicle 200 from one or more driving rating information source(s) 140. The vehicle 200 can be configured to present or cause to be presented the driving rating information within the vehicle 200. For purposes of this example, the driving rating information can be presented in a visual manner. The driving rating information can be presented on a display within the vehicle 200.

Figure 9:
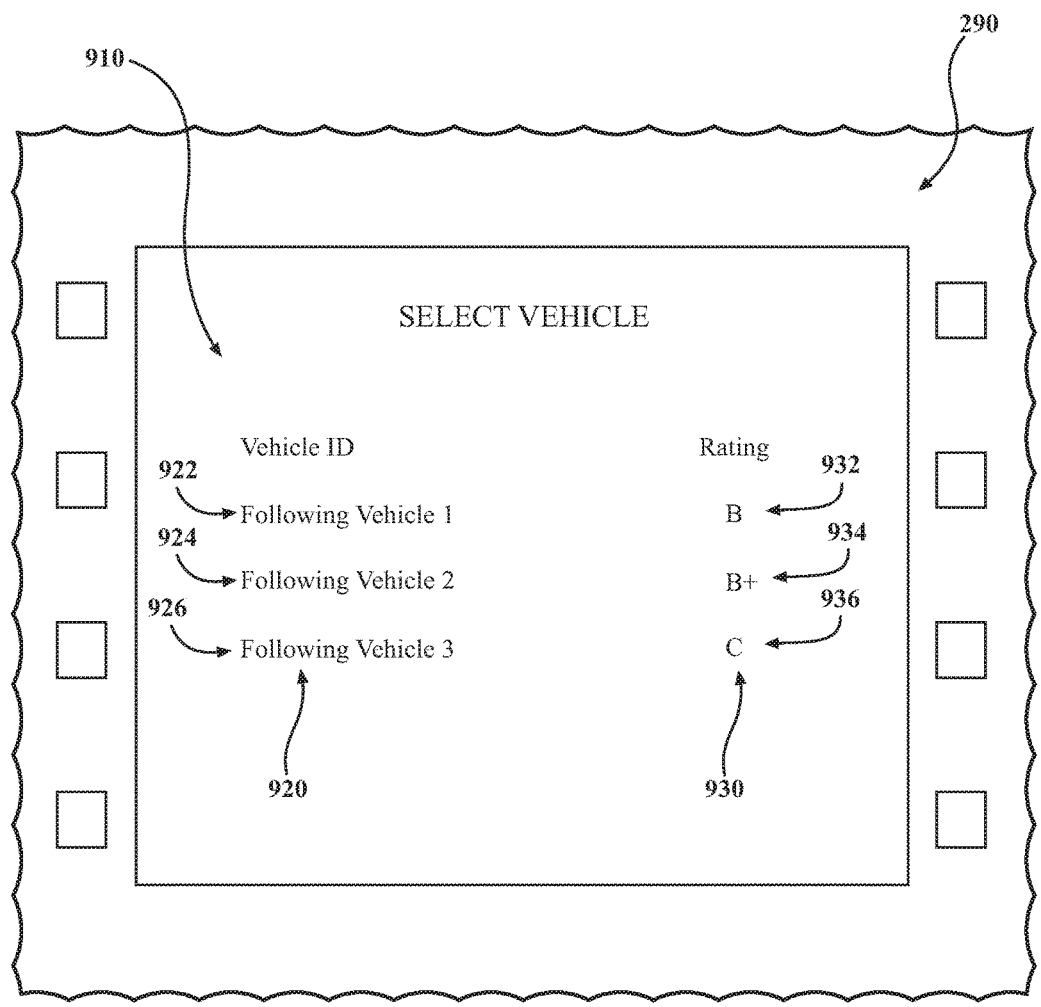
FIG. 9 is an example of a display presenting driving rating information with respect to the plurality of following vehicles.

An example of the driving rating information presented on a display 290 is shown in FIG. 9. In this example, the driving rating information can be presented as a table 910 with a plurality of columns. One column can be a vehicle identifier column 920 and a second column can be a driving rating column 930. The table 910 can include a row for each for each of the vehicles 750, 760, 770.

In the vehicle identifier column 920, one or more identifiers 922, 924, 926 can be presented for the vehicles 750, 760, 770. Any suitable identifier can be used to distinguish the vehicles 750, 760, 770. The identifier can be one that allows a vehicle occupant to readily understand which vehicle in the environment 700 is being referred to. Examples of identifiers can include a picture, a name, a vehicle make, a vehicle model, a description of whether the vehicle is leading or following, and/or a general description of the relative location of the vehicle (e.g., left, right, same lane, etc.).

The driving rating information for each vehicle 750, 760, 770 can be associated with the identifier 922, 924, 926 in any suitable manner. In the example shown, the driving ratings 932, 934, 936 can be presented in the same row as the respective the identifier 922, 924, 926. In this example, the driving ratings 932, 934, 936 are provided on a scale similar to school letter grades.

A vehicle occupant (e.g., a driver) can view the rating information. The vehicle occupant can select one of the vehicles 750, 760, 770 that it wishes the vehicle 200 to lead. The selection can be made in any suitable manner, such as by touch screen input, audible input, or other suitable form of input. For purposes of this example, the vehicle occupant can select the vehicle 760 because it has the highest driving rating. A vehicle occupant may feel that a higher rating will mean that the associated vehicle is less likely to rear end the vehicle 200.

In response to receiving the selection, the vehicle 200 can be caused to implement one or more driving maneuvers relative to the vehicle 760. In this example, since the selected vehicle 760 is already in the same travel lane 720 as the vehicle 760, the vehicle 200 can remain in the second travel lane 720. The autonomous driving module(s) 260 and/or the processor(s) 210 can send a signal to one or more actuators 250 and/or one or more vehicle systems 240 to implement appropriate driving maneuvers to lead the selected vehicle 760 at a predetermined leading distance LD, as is shown in FIG. 8. In one or more arrangements, the predetermined leading distance LD can be a fixed distance. In one or more arrangements, the predetermined leading distance LD can be variable based at least in part on the driving rating information associated with the selected vehicle 760. For instance, if the driving rating of the selected vehicle 760 is above a predetermined driving rating threshold (e.g., grade of a B or better or any other threshold), the predetermined leading distance LD can be set to a first distance. If the driving rating of the selected vehicle 760 is below the predetermined driving rating threshold, the predetermined leading distance LD can be set to a second distance. The second distance can be greater than the first distance.

In some instances, a vehicle occupant may not select any of the vehicles 750, 760, 770 to follow. In such case, the vehicle 200 can continue to be operated as it is currently being operated. Alternatively, if no selection is received, a special mode can be implemented. In the special mode, the vehicle 200 can automatically select one of the vehicles 750, 760, 770 based on the driving rating information for the vehicles 750, 760, 770. Such selection can be performed by the driving ratings module(s) 270, the autonomous driving module(s) 260, and/or the processor(s) 210. In some stances, the vehicle 200 may prompt the vehicle occupant for approval.

Figure 8:
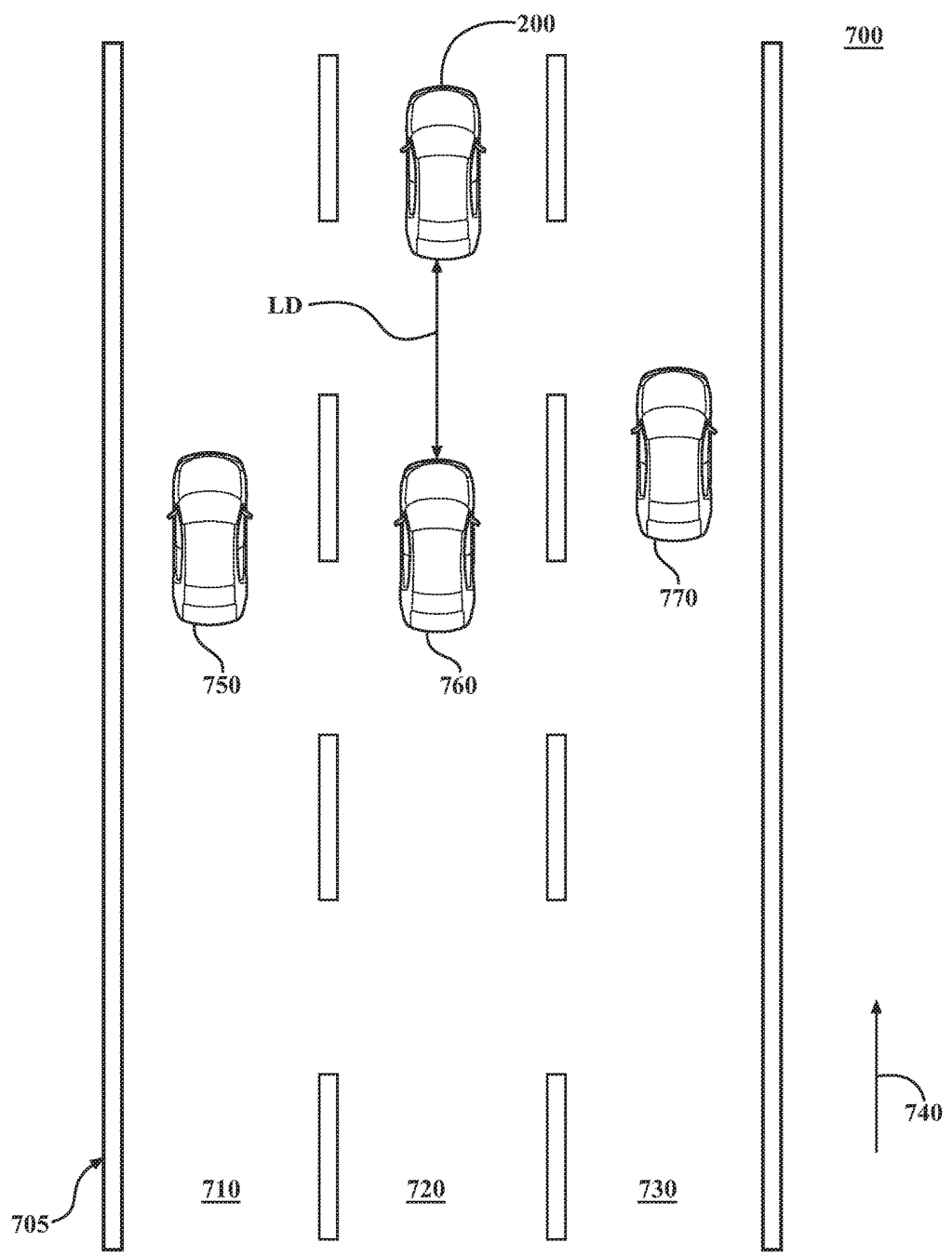
FIG. 8 is an example of the scenario of FIG. 7 at a subsequent moment in time, wherein the vehicle as has implemented a driving maneuver to lead a selected one of the following vehicles.

While FIGS. 4-5 show an example in which there are only leading vehicles and FIGS. 7-8 show an example in which there are only trailing vehicles, it will be understood that arrangements are not limited in this regard. Indeed, it should be noted that arrangements herein can be used in examples in which there are one or more leading vehicles and one or more trailing vehicles. The driving rating information for the detected leading and trailing vehicles can be presented within the vehicle, as described herein.

Figure 10:
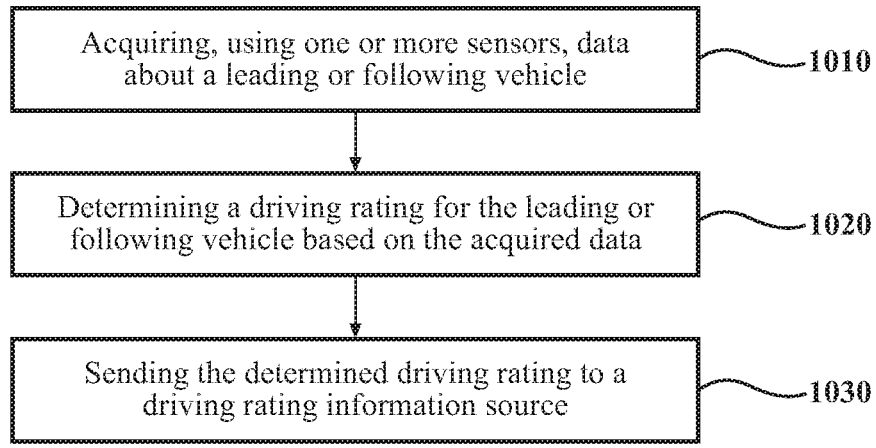
FIG. 10 is an example of a method of generating driving rating information.

Referring now to FIG. 10, an example of a method 1000 of generating driving ratings for a vehicle is shown. The method 1000 illustrated in FIG. 10 may be applicable to the embodiments described above in relation to FIGS. 1 and/or 2, but it is understood that the method 1000 can be carried out with other suitable systems and arrangements. Moreover, the method 1000 may include other steps that are not shown here, and in fact, the method 1000 is not limited to including every step shown in FIG. 10. The steps that are illustrated here as part of the method 1000 are not limited to this particular chronological order. Indeed, some of the steps may be performed in a different order than what is shown and/or at least some of the steps shown can occur simultaneously.

At block 1010, data about another vehicle that the vehicle 200 is leading or following can be acquired. Such data can be acquired by, for example, one or more sensors of the sensor system 220. For instance, the sensing can be performed by one or more driving environment sensors 222 (e.g., one or more RADAR sensors 223, the one or more LIDAR sensors 224, the one or more sonar sensors 225, the one or more cameras 226, and/or one or more other driving environment sensors). The sensing can be performed continuously, periodically, irregularly, randomly, or responsive to a vehicle occupant command or other input. The method 1000 can continue to block 1020.

At block 1020, a driving rating 180 for the leading or following vehicle can be determined. The driving rating 180 can be determined in any suitable manner can be based on one or more factors, including any of those described herein. The driving rating 180 can be determined by, for example, the driving rating module(s) 270 and/or the processor(s) 210. In some instances, the driving rating 180 can be determined in part using a rating provided by a vehicle occupant. The method can continue to block 1030

At block 1030, the vehicle 200 can send the driving rating 180 to one or more driving rating information sources 140. In some instances, the sending of the driving rating 180 can be performed automatically, or it can be performed responsive to receiving approval from a vehicle occupant. In one or more arrangements, the driving rating 180 can be sent directly to the vehicle that is being rated. In such case, the driving rating 180 can be stored onboard the vehicle or elsewhere so it may be subsequently provided to other vehicles that may encounter the vehicle. Alternatively or in addition, the driving rating 180 can be sent to a remote rating server. In one or more arrangements, the driving rating 180 can be sent with an identifier for the vehicle being rated. In one or more arrangements, the driving rating 180 can be sent with other information (e.g., the amount of time and/or the distance that the vehicle was led or followed by the rating vehicle). The sending can be performed by one or more elements of the vehicle 200, such as the driving ratings module(s) 270, the transceiver(s) 219, and/or the processor(s) 210.

The method 1000 can end. Alternatively, the method 1000 can return to block 1010. The method 1000 can include additional and/or alternative blocks (not shown).

Figure 11:
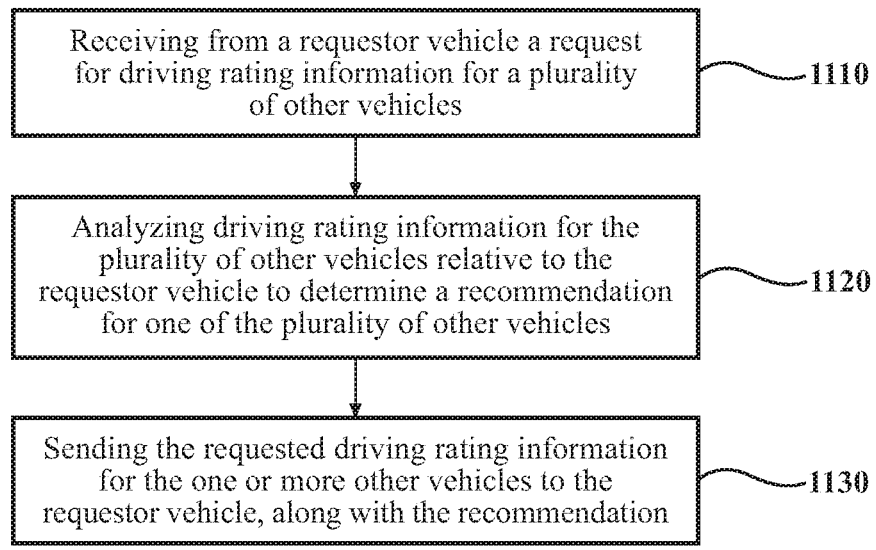
FIG. 11 is an example of a method of determining a recommended vehicle to lead and/or follow.

In some arrangements, a driving rating information source 140 (e.g., a remote server) that includes driving rating information relating to a plurality of different vehicles can be configured to provide the driving rating information to a requesting vehicle. In some instances, the driving rating information source 140 can also perform one or more analyses in response to receiving a request. In this respect, another method 1100 according to arrangements herein is shown in FIG. 11. The method 1100 illustrated in FIG. 11 may be applicable to the embodiments described above in relation to FIGS. 1 and/or 2, but it is understood that the method 1100 can be carried out with other suitable systems and arrangements. Moreover, the method 1100 may include other steps that are not shown here, and in fact, the method 1100 is not limited to including every step shown in FIG. 11. The steps that are illustrated here as part of the method 1100 are not limited to this particular chronological order. Indeed, some of the steps may be performed in a different order than what is shown and/or at least some of the steps shown can occur simultaneously.

At block 1110, a request can be received from a requestor vehicle. The request can be to provide driving rating information for a plurality of nearby vehicles. The request can include identifiers for the plurality of nearby vehicles. The request can include identifiers for the requestor vehicle, preferences or settings for the requestor vehicle, and/or other information regarding the requestor vehicle. As an example, a preference for the requestor vehicle may be for vehicles with a predefined minimum rating, a minimum number of ratings, no negative ratings, etc. The method 1100 can continue to block 1120.

At block 1020, driving rating information for the plurality of nearby vehicles can be analyzed in any suitable manner relative to the requestor vehicle. That is, the driving rating information can be analyzed relative to any driving rating information for the requestor vehicle that is already included in the driving rating information source 140 and/or any other information that the requestor vehicle may send about itself. Such information can be analyzed to determine a recommendation as to which of the plurality of nearby vehicles the driver of the requestor vehicle should select. For instance, the analysis may reveal that the requestor vehicle's information is compatible with (or most compatible with among the plurality of other vehicles) the driving rating information for one of the plurality of vehicles. The method 1100 can continue to block 1130.

At block 1030, the requested driving rating information for the plurality of other vehicles can be sent to the requestor vehicle, along with the recommendation. Such information can be presented to an occupant of the requestor vehicle. The occupant can select one of the vehicles to lead or follow. The occupant's selection may or may not match the recommendation.

The method 300 can end. Alternatively, the method 300 can return to block 310. In one or more arrangements, the method 300 can be performed in response to receiving an input from a vehicle occupant to activate the adaptive cruise control system of the vehicle 200. In this way, the vehicle occupant can decide whether or not to continue with the use of the adaptive cruise control system based on the presented driving rating information.

The method 1100 can end. Alternatively, the method 1100 can return to block 1110. The method 1100 can include additional and/or alternative blocks (not shown).

It will be appreciated that arrangements described herein can provide numerous benefits, including one or more of the benefits mentioned herein. For example, arrangements described herein can provide information to a vehicle driver to allow them to make informed decisions. Arrangements described herein can help a human driver select which vehicle in the surrounding environment that it should follow or lead. Arrangements herein can provide the information to a vehicle occupant in a user-friendly manner that can be easily and quickly understood. Arrangements described herein can also provide a degree of comfort and confidence to vehicle occupants and/or improve vehicle safety.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of providing driving ratings for a sensing vehicle, the method comprising:
   sensing an external environment of the sensing vehicle to detect one or more nearby vehicles therein;
   receiving driving rating information for each nearby vehicle of the one or more nearby vehicles, the driving rating information received for a nearby vehicle of the one or more nearby vehicles including one or more previous driving ratings for the nearby vehicle of the one or more nearby vehicles, wherein each of the one or more previous driving ratings for the nearby vehicle of the one or more nearby vehicles was generated by a vehicle that was previously either followed or led by the nearby vehicle of the one or more nearby vehicles; and presenting within the sensing vehicle the driving rating information and an identifier for the one or more nearby vehicles, the driving rating information being associated with a respective identifier for the one or more nearby vehicles, the driving rating information including a driving rating score based at least partially on an average of the one or more previous driving ratings for the one or more nearby vehicles.

2. The method of claim 1, wherein the driving rating information received for a nearby vehicle of the one or more nearby vehicles includes preferences of a driver of the nearby vehicle regarding one or both of being followed by the sensing vehicle or being led by the sensing vehicle.

3. The method of claim 1, wherein receiving driving rating information for the one or more nearby vehicles includes receiving the driving rating information directly from the one or more nearby vehicles.

4. The method of claim 1, wherein receiving driving rating information for the one or more nearby vehicles includes receiving from the driving rating information from a remote rating server.

5. The method of claim 1, wherein presenting within the sensing vehicle the driving rating information for the one or more nearby vehicles includes visually presenting on a display within the sensing vehicle the driving rating information for the one or more nearby vehicles.

6. The method of claim 1, further including:
receiving from a sensing vehicle occupant a selected vehicle of the one of the one or more nearby vehicles, and
causing the sensing vehicle to implement one or more driving maneuvers relative to the selected vehicle.

7. The method of claim 6, wherein sensing the external environment of the sensing vehicle to detect one or more nearby vehicles therein includes sensing the external environment of the sensing vehicle to detect one or more leading vehicles therein, and wherein causing the sensing vehicle to implement one or more driving maneuvers relative to the selected vehicle includes causing the sensing vehicle to follow the selected vehicle, and wherein the one or more driving maneuvers relate to following the selected vehicle.

8. The method of claim 6, wherein sensing the external environment of the sensing vehicle to detect one or more nearby vehicles therein includes sensing the external environment of the sensing vehicle to detect one or more following vehicles therein, and wherein causing the sensing vehicle to implement one or more driving maneuvers relative to the selected vehicle includes causing the sensing vehicle to lead the selected vehicle, and wherein the one or more driving maneuvers relate to leading the selected vehicle.

9. The method of claim 6, further including:
determining a driving rating for the selected vehicle; and
sending the determined driving rating for the selected vehicle to a driving rating information source.

10. The method of claim 6, wherein one or more driving maneuvers includes following or leading the selected vehicle, and further including:
if the driving rating of the selected vehicle is above a predetermined driving rating threshold, set a predetermined minimum distance between the sensing vehicle and the selected vehicle at a first distance; and
if the driving rating of the selected vehicle is below a predetermined driving rating threshold, set a predetermined minimum distance between the sensing vehicle and the selected vehicle at a second distance, wherein the second distance is greater than the first distance.

11. The method of claim 1, further including:
receiving a request for driving rating information for the sensing vehicle from a requesting vehicle in the external environment; and
sending the driving rating information for the sensing vehicle to the requesting vehicle, wherein the driving rating information includes preferences of a driver of the sensing vehicle related to being followed by the requesting vehicle or being led by the requesting vehicle.

12. A driving rating system for a sensing vehicle, the system comprising:
one or more sensors configured to sense an external environment of the sensing vehicle to detect one or more nearby vehicles located therein; and
a processor operatively connected to one or more sensors, the processor being programmed to initiate executable operations comprising:
receiving driving rating information for each nearby vehicle the one or more nearby vehicles, the driving rating information received for a nearby vehicle of the one or more nearby vehicles including one or more previous driving ratings for the nearby vehicle of the one or more nearby vehicles, wherein each of the one or more previous driving ratings for the nearby vehicle of the one or more nearby vehicles was generated by a vehicle that was previously either followed or led by the nearby vehicle of the one or more nearby vehicles; and
presenting within the sensing vehicle the driving rating information and an identifier for the one or more vehicles, the driving rating information being associated with a respective identifier for the one or more nearby vehicles, the driving rating information including a driving rating score based at least partially on an average of the one or more previous driving ratings for the one or more nearby vehicles.

13. The system of claim 12, wherein the driving rating information received for a nearby vehicle of the one or more nearby vehicles includes preferences of a driver of the nearby vehicle regarding one or both of being followed by the sensing vehicle or being led by the sensing vehicle.

14. The system of claim 12, further including a display operatively connected to the processor, wherein presenting within the sensing vehicle the driving rating information for the one or more nearby vehicles includes visually presenting on a display within the sensing vehicle the driving rating information for the one or more nearby vehicles.

15. The system of claim 12, wherein the executable operations further include:
receiving from a sensing vehicle occupant a selection of one of the identified one or more nearby vehicles, and
causing the sensing vehicle to implement one or more driving maneuvers relative to the selected vehicle.

16. The system of claim 15, wherein sensing the external environment of the sensing vehicle to detect one or more nearby vehicles therein includes sensing the external environment of the sensing vehicle to detect one or more leading vehicles therein, and wherein causing the sensing vehicle to implement one or more driving maneuvers relative to the selected vehicle includes causing the sensing vehicle to follow the selected vehicle, and wherein the one or more driving maneuvers relate to following the selected vehicle.

17. The system of claim 15, wherein sensing the external environment of the sensing vehicle to detect one or more nearby vehicles therein includes sensing the external environment of the sensing vehicle to detect one or more following vehicles therein, and wherein causing the sensing vehicle to implement one or more driving maneuvers relative to the selected vehicle includes causing the sensing vehicle to lead the selected vehicle, and wherein the one or more driving maneuvers relate to leading the selected vehicle.

18. The system of claim 15, wherein the executable operations further include:
    determining a driving rating for the selected vehicle; and
    sending the determined driving rating for the selected vehicle to a driving rating information source.

19. The system of claim 15, wherein one or more driving maneuvers includes following or leading the selected vehicle, and wherein the executable operations further include:
    if the driving rating of the selected vehicle is above a predetermined driving rating threshold, set a predetermined minimum distance between the sensing vehicle and the selected vehicle at a first distance; and
    if the driving rating of the selected vehicle is below a predetermined driving rating threshold, set a predetermined minimum distance between the sensing vehicle and the selected vehicle at a second distance, wherein the second distance is greater than the first distance.

20. The system of claim 12, wherein the executable operations further include:
    receiving a request for a driving rating of the vehicle from a requesting vehicle in the external environment; and
    sending the driving rating for the sensing vehicle to the requesting vehicle, wherein the driving rating information includes preferences of a driver of the sensing vehicle related to being followed by the requesting vehicle or being led by the requesting vehicle.

* * * * *